United States Patent [19]
Onodera et al.

[11] Patent Number: 5,634,258
[45] Date of Patent: Jun. 3, 1997

[54] METHOD FOR FORMING COILS OF MOTOR ROTORS

[75] Inventors: Tsugio Onodera; Yasuhiro Kanai, both of Gunma-ken, Japan

[73] Assignee: Mitsuba Electric Mfg. Co., Ltd., Gunma-ken, Japan

[21] Appl. No.: 545,300

[22] Filed: Oct. 19, 1995

[30] Foreign Application Priority Data

Nov. 7, 1994 [JP] Japan ................... 6-297920

[51] Int. Cl.$^6$ ................................................. H02K 15/02
[52] U.S. Cl. ............................ 29/598; 264/272.2; 310/43
[58] Field of Search .................. 29/598, 596; 264/272.2, 264/272.19; 310/43

[56] References Cited

U.S. PATENT DOCUMENTS 2,019,064  10/1935  Apple .
2,820,914   1/1958  Rudoff et al. ................... 264/272.2 X
5,130,596   7/1992  Umeki .
5,490,319   2/1996  Nakamura et al. ............... 264/272.2 X

FOREIGN PATENT DOCUMENTS 06122133A  5/1994  Japan .

OTHER PUBLICATIONS

Patent Abstracts of Japan, unexamined applications, E field, vol. 15, No. 236, Jun. 18, 1991, The Patent Office Japanese Government, p. 21 E 1078; & JP-A-03 070 441 (Aison).

Patent Abstracts of Japan, unexamined applications, M field, vol. 12, No. 356, Sep. 26, 1988, The Patent Office Japanese Government, p. 128 M 745; & JP-A-63 114 613 (Nippon).

Primary Examiner—Carl E. Hall
Attorney, Agent, or Firm—Skjerven, Morrill, MacPherson, Franklin & Friel; Thomas S. MacDonald

[57] ABSTRACT

In a method for forming the coils passed through the core slots of a motor rotor so as to keep the coils fully received in the core slots, a motor rotor, in which coils are wound around the core thereof, is received in a metallic mold die which has a die surface spaced from the outer circumferential surface of the core by a certain gap, and resin material is injected from an injection inlet provided in an axial end of the upper metallic mold die. As the resin material is injected into the cavity of the metallic mold die, the resin material first fills the gap, and then flows into the core slots from the outer periphery thereof. The flow and the pressure of the resin material causes the coils to be pushed toward the bottom regions of the core slots, and once the filled resin material is cured, the coils are firmly secured well inside the core slots. Thereby, the cost of the component parts is reduced, and the fabrication process in forming coils of motor rotors is simplified, in contrast to the conventional method which uses wedges to retain the coils in the core slots.

3 Claims, 4 Drawing Sheets

METHOD FOR FORMING COILS OF MOTOR ROTORS

TECHNICAL FIELD

The present invention relates to a method for forming the coils passed through the core slots of a motor rotor into a state in which the coils are fully submerged or received in the core slots.

BACKGROUND OF THE INVENTION

Conventionally, when winding coils around core teeth, a high tension is applied to the coil wire which could cause the coating of the coil wire to be damaged by the edges of the core teeth. If there is any possibility of such an occurrence, the tension applied by the coil former (coil winding machine) to the coil wire must be reduced. Once the coils are fully wound around the core teeth, resin material is coated over the motor rotor.

A motor manufacturing process of this type typically comprises the steps of preheating the motor rotor, coating the resin material over the motor rotor, adjusting or trimming the coating, and curing the resin material. The coating step can be carried out by using an automated coating machine, but the trimming step has to be manually carried out, and the time period required from the start of the heating step to the completion of the curing step is so long (typically approximately two hours) that the coils which may have been initially fully received in the core slots may spring back out of the core slots by the time the curing step is completed.

Therefore, conventionally, as is illustrated in FIG. 4, as a counter measure to prevent coils 8, which are received in core slots 4a, from coming out of the core slots 4a, the bulging of the coils 8 in radially outward direction was restrained by placing a wedge 11 in each of the core slots 4a from an axial end of the core 4 so as to be engaged by the overhang portions of the adjacent core teeth 4a, after the coils 8 are wound around the core 4 of the motor rotor 3 and before the resin material is coated over the motor rotor.

However, as the number of core slots increases, the necessary number of wedges, as well as the amount of work involved, increases to such an extent that the cost of the component parts and the complication of the manufacturing process become substantial.

BRIEF SUMMARY OF THE INVENTION

In view of such problems of the prior art, a primary object of the present invention is to provide a method for forming coils of motor rotors which can reduce the cost of the component parts and simplify the manufacturing process.

According to the present invention, such an object can be accomplished by providing a method for forming coils on cores of motor rotors, comprising the steps of: placing a motor rotor, on which coils are wound, in a metallic mold die with a gap defined between a die surface of the mold die and an outer circumferential surface of a core of the motor rotor; injecting resin material from an inlet provided in the mold die to transfer the resin material from an axial end of the mold die to the other side so that the resin material may push the coils into core slots of the motor rotor as the resin material fills the gap and flows into the core slots; and allowing the resin material to cure before the coils spring back out of the core slots.

Because a gap is provided between the die surface of the metallic mold die and the outer circumferential surface of the core, the resin material is filled over the entire outer circumferential surface of the core, and is then filled into the core slots from the outer periphery thereof. The flow and the pressure of the resin material forces the coils toward the bottom regions of the core slots, and once the resin material is allowed to cure, the coils are firmly secured in the core slots while they are kept pushed in the core slots. Because the spring-back of the coils is known to take place over the period of approximately one hour after the coils are wound, by allowing the resin material to cure in a relatively short time period, it is possible to firmly secure the coils before the coils are pushed out of the core slots by the spring-back. By causing the resin material to flow from one axial end to the other with respect to the axial line of the core, the resin material can be filled into the core slots while pressing the coils from the axial end without leaving any air layers or air bubbles in the core slots.

Once the resin material has cured, the outer profile of the motor rotor may be adjusted by removing a part of the resin material from the outer circumferential surface of the core. Because the flow of the resin material in the cavity of the mold die is directed in the axial direction, it can be used for the axial positioning of the motor rotor in the mold die by providing a reference surface in the mold die so that an outer end surface of a commutator of the motor rotor may abut the reference surface by the flow and pressure of the resin material in the mold die. Thereby, the cost of the component parts is reduced, and the fabrication process in forming coils of motor rotors is simplified, in contrast to the conventional method which uses wedges to retain the coils in the core slots.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
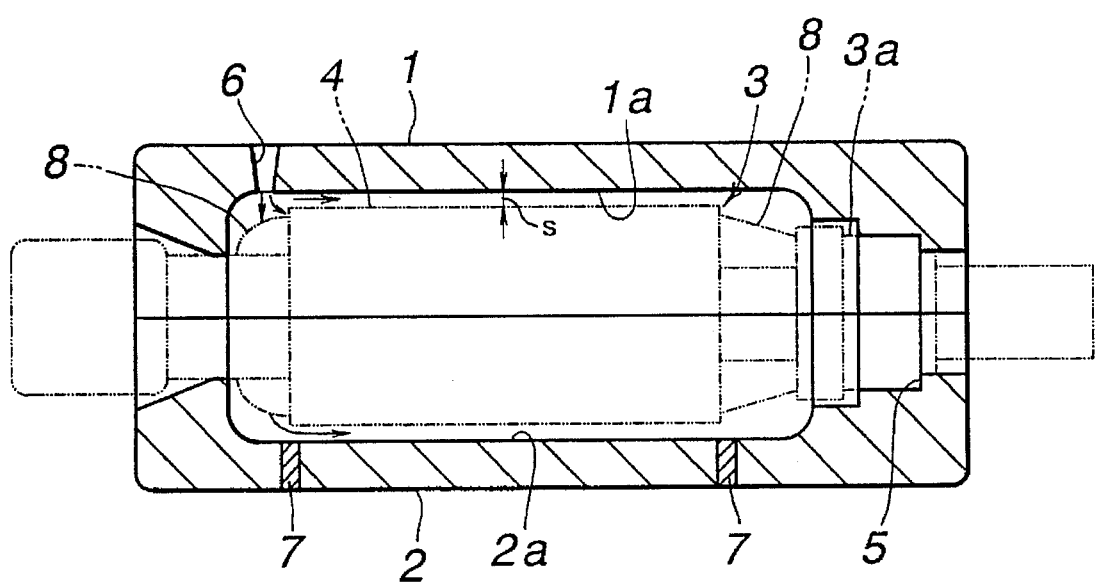
FIG. 1 is a sectional side view of a metallic mold die for injecting resin material into motor rotors according to the present invention.

FIG. 1 is a sectional side view of a metallic mold die for injecting resin material into motor rotors according to the present invention. This metallic mold die comprises an upper die half 1 and a lower die half 2 which are supported by frames, not shown in the drawing, so that the two die halves may be closed upon each other and opened up as desired. The two die halves 1 and 2 internally define die surfaces 1a and 2a for receiving the core 4 of a motor rotor 3 (shown in dash lines) when the two die halves 1 and 2 are closed upon each other, and is provided with support portions for supporting the two ends of the motor rotor 3 so as to prevent leakage of resin material therefrom. One of the support portions is provided with a reference surface 5 at a shoulder portion thereof, and the motor rotor 3 can be axially positioned with respect to the metallic mold die by abutting an outer axial end surface of a commutator 3a thereof onto this reference surface 5.

The upper die half 1 is provided with an injection inlet 6 which opens out at an axial end of the core 4, whereby resin material supplied under pressure from a resin material supply device, not shown in the drawing, can be introduced into the cavity defined in the metallic mold die. The lower die half 2 is provided with knock out pins 7 for removing the motor rotor 3 out of the metallic mold die after the motor rotor 3 is molded with resin material, and the two die halves 1 and 2 are opened up.

Figure 2:
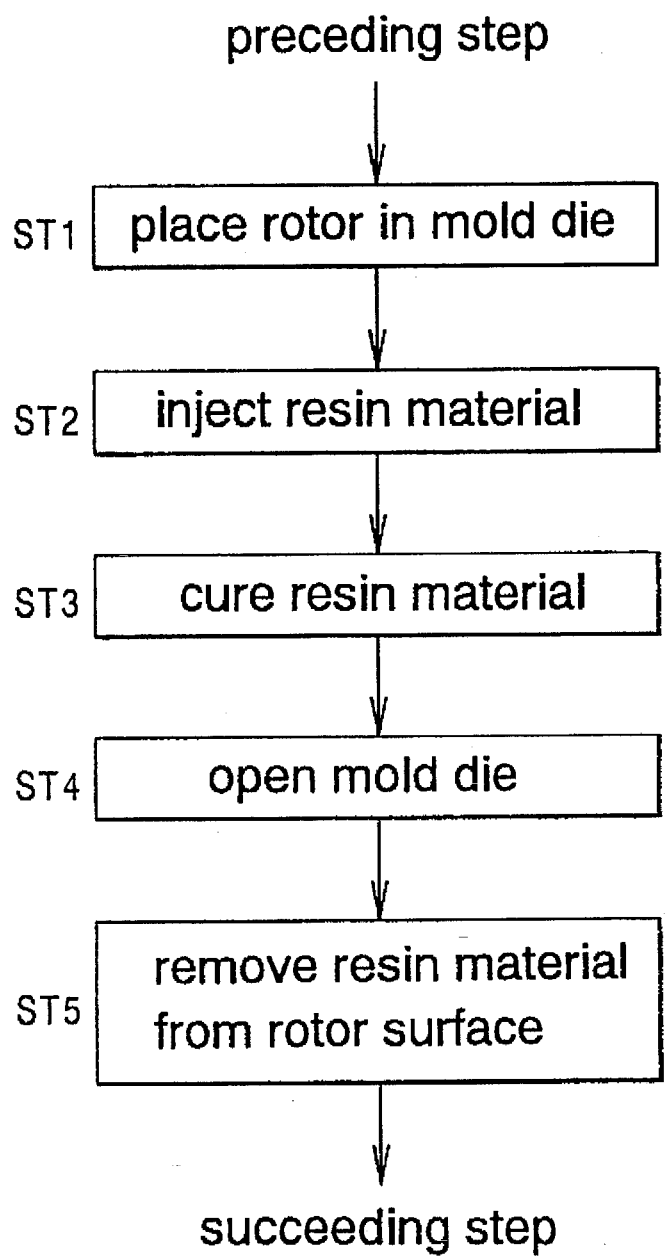
FIG. 2 is a flow chart showing the manufacturing process according to the present invention.

The mode of molding the motor rotor 3 with resin material by using the above described metallic die mold is now described in the following with reference to FIG. 2. In step 1, the motor rotor 3 (FIG. 3), having coils 8 passed in the core slots 4a thereof in the preceding step, is placed between the two die halves 1 and 2, and is properly positioned therein by abutting the commutator 3a thereof onto the reference surface 5 as mentioned previously. In step 2, the resin material is injected into the cavity of the metallic mold die from the injection inlet 6 as described previously. The resin material, for instance, may consist of BMC (bulk mold compound) which is heated to approximately 260° C.

In the metallic mold die of the present invention, the part of the cavity of the metallic mold die receiving the core 4 is provided with a somewhat larger inner diameter than the outer diameter of the core 4 so that a certain gap s (for instance 0.2 to 0.4 mm) is defined between the inner circumferential surface of the metallic mold die and the outer circumferential surface of the core 4. Therefore, in the injecting step of step 2, after the coil end portion on one axial end of the core 4 is filled by the resin material, the resin material fills into the gap s over the entire outer circumference of the core 4, and then infiltrates into the core slots 4a as indicated by the imaginary arrows in FIG. 3. As the resin material 9 flows into each of the core slots 4a, the coil 8 is pushed into the bottom region of the core slot 4a.

Because the injection inlet 6 is located on an axial end of the metallic mold die, the resin material also flows toward the other axial end of the metallic mold die along the outer circumferential surface of the core 4 as indicated by the solid arrows in FIG. 1. Therefore, the resin material flows inside the core slots 4a from one axial end to the other, and the coils 8 can be pushed into the core slots 4a from an axial end without leaving any air layers or air bubbles in the core slots 4a. In this embodiment, the injection inlet 6 is provided in the opposite end of the commutator 3a with respect to the axial line of the motor rotor 3. Thereby, the resin material injected from the injection inlet 6 flows as indicated by arrows of FIG. 1, and thereby forces the core 4 toward the reference surface 5. Because the commutator 3a is made to abut the reference surface 5 for positioning purpose, and the commutator 3a is thus pushed against the reference surface 5, the injected resin material also contributes to the accurate positioning of the core 4.

The time period for injecting the resin material may be approximately one minute in the case of a small motor rotor having a diameter of 70 mm and approximately 30 core slots 4a, and the injected resin material is allowed to naturally cure in about 100 seconds in step 3. When the resin material is not injected, the coils 8 would undergo deformation by spring-back in about one hour. However, by filling the resin material and curing it, the resin material can be allowed to cure before a part of the coils are displaced out of the core slots 4a by spring-back whereby the cured resin material 10 secures the coils 8 in the core slots 4a.

Figure 3:
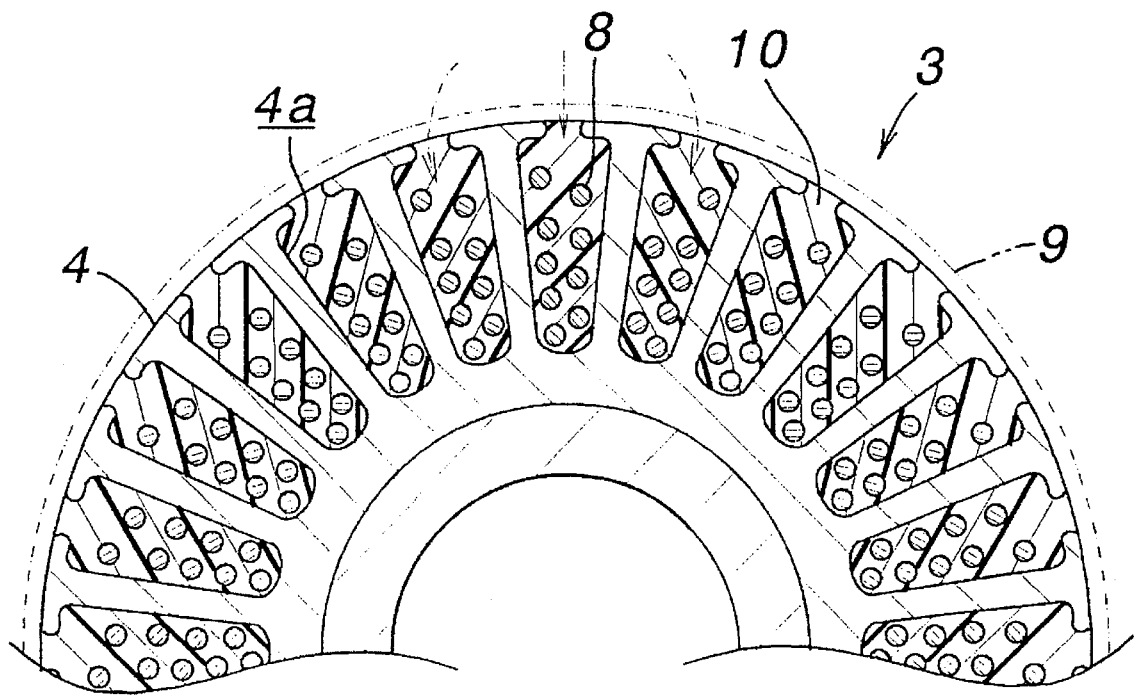
FIG. 3 is an enlarged sectional view of a part of the core of a motor rotor according to the present invention taken along a radial arc.
Figure 4:
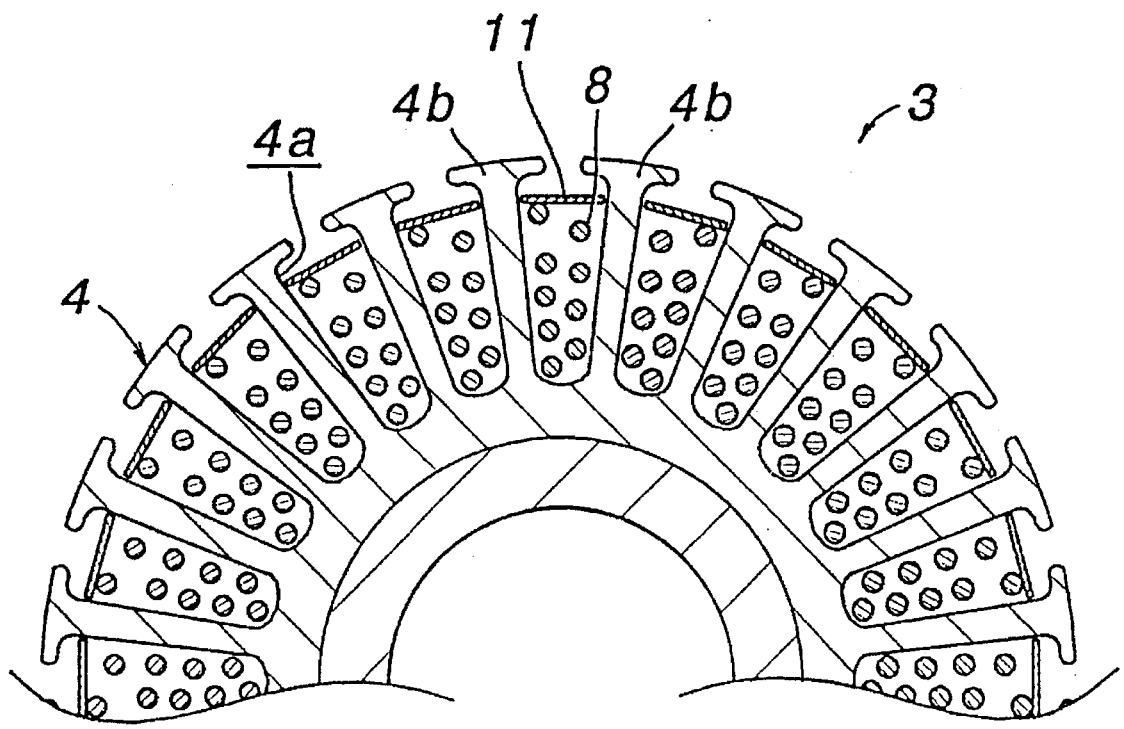
FIG. 4 is an enlarged sectional view of a part of the core of a conventional motor rotor taken along a radial line.

In step 4, the motor rotor 3 which has been molded by the resin material is taken out of the metallic mold die. In step 5, the resin material 9, which has been filled into the gaps s, and has cured over the outer circumferential surface of the core 4 as indicated by imaginary lines in FIG. 3, is machined off until the outer circumferential surface of the core 4 is exposed. The motor rotor 3, in which the coils are firmly secured in the core slots 4a by the filled resin material 10, is transferred to the next manufacturing step.

Thus, according to the present invention, because coils can be firmly secured in the core slots without using any wedges, the number of component parts can be reduced, and the need for the work involved in inserting wedges can be eliminated in contrast to the conventional method using wedges for retaining the coils. The present invention hence reduces the cost for the component parts and simplifies the manufacturing process.

Although the present invention has been described in terms of preferred embodiments thereof, it is obvious to a person skilled in the art that various alterations and modifications are possible without departing from the scope of the present invention which is set forth in the appended claims.

What we claim is:

1. A method for forming coils on cores of motor rotors, comprising the steps of:
    providing a motor rotor including a core with radial core slots and wound coils, said coils being subject to spring back in said slots;
    placing the motor rotor in a metallic mold die;
    providing a circumferential gap defined between an inner circumferential die surface of the mold die and an outer circumferential surface of the core of said motor rotor;
    injecting resin material from an inlet provided in said mold die to transfer said resin material from an axial end of said mold die through said gap to the other end of said die and into said core slots so that said resin material forces said coils into bottom regions of each of the core slots of said motor rotor as said resin material fills said gap and flows into said core slots; and
    allowing said resin material to cure and secure said coils before spring back of the coils out of said core slots.

2. A method for forming coils on cores of motor rotors according to claim 1, further comprising the step of thereafter removing a part of said resin material from an outer circumferential surface of said core.

3. A method for forming coils on cores of motor rotors according to claim 1, further comprising providing the metallic mold die with a reference surface on which an outer end surface of a commutator of said motor rotor abuts, and providing said injection inlet in an axial end of said metallic mold die opposite to said commutator.

* * * * *

UNITED STATES PATENT AND TRADEMARK OFFICE
CERTIFICATE OF CORRECTION

PATENT NO. : 5,634,258
DATED : June 3, 1997
INVENTOR(S) : Onodera, et. al.

It is certified that error appears in the above-identified patent and that said Letters Patent is hereby corrected as shown below:

Title page, item [73], Assignee: change Mitsuba Electric Mfg. Co., Ltd. to -- Mitsuba Corporation.--

Signed and Sealed this

Tenth Day of February, 1998

*Attest:*

BRUCE LEHMAN

*Attesting Officer*          *Commissioner of Patents and Trademarks*